United States Patent [19]

Coulter et al.

[11] 4,233,749
[45] Nov. 18, 1980

[54] APPARATUS FOR MEASURING AND MARKING PRESELECTED MEASUREMENTS

[76] Inventors: Howard W. Coulter, 12 Oakcrest Dr., Pekin, Ill. 61554; Dennis R. Triggs, 348 E. Fernwood St., Morton, Ill. 61550

[21] Appl. No.: 30,304

[22] Filed: Apr. 16, 1979

[51] Int. Cl.³ .................. B25H 7/04; G01B 5/14
[52] U.S. Cl. .................. 33/189; 33/132 R; 33/174 PC; 364/562
[58] Field of Search ............ 33/125 R, 125 A, 125 D, 33/189, 132, 174 PC, 36, 132 R, 132 A; 364/560, 561, 562

[56] References Cited

U.S. PATENT DOCUMENTS

| | | | |
|---|---|---|---|
| 2,767,981 | 10/1956 | Hempel | 33/132 A |
| 2,797,919 | 7/1957 | Hempel | 33/132 |
| 3,063,370 | 11/1962 | Eberhardt | 33/36 |
| 3,087,248 | 4/1963 | Martin | 33/132 X |
| 3,271,564 | 9/1966 | Rosenfeld et al. | 33/174 PC |
| 3,524,371 | 8/1970 | Kroger | 33/132 |
| 3,558,030 | 1/1971 | Hempel | 33/132 |

*Primary Examiner*—William D. Martin, Jr.
*Attorney, Agent, or Firm*—James R. Bell

[57] ABSTRACT

Apparatus for marking preselected measurements on an object includes a device for receiving and storing data. A measurement device measures preselected distance on the object and registers the measured distance with the stored data. A marking device marks the object when the preselected distance is registered.

9 Claims, 14 Drawing Figures

FIG_8_

FIG_9_

FIG_10_

APPARATUS FOR MEASURING AND MARKING PRESELECTED MEASUREMENTS

This invention was disclosed in Disclosure Document No. 070,566 filed in the U.S. Patent and Trademark Office on Apr. 20, 1978.

BACKGROUND OF THE INVENTION

1. Field of the Invention

This invention relates generally to geometrical instruments and more particularly to those used for marking predetermined intervals of distance.

2. Description of the Prior Art

During the building of a structure, it is common to situate reinforcing members at regularly spaced intervals. Also, as in the construction of a wall or a partition to be placed in a structure, doorway and window openings are provided for. As a result, persons engaged in the actual construction are required to make measurements on an object and to mark the object at intervals indicating the location of those reinforcing members, doorways and window openings. These measurements are generally accomplished through the use of an extendable-retractable steel tape graduated in intervals of feet, inches and fractions of an inch. Thus, by extending the tape along the object, necessary marks can be applied to the object at the desired intervals by the use of chalk, a pencil or some other marking device.

It would be advantageous to provide apparatus which could be moved along the object and automatically apply the necessary marks on the object. Also, it would be advantageous to provide apparatus capable of being pre-set to apply the marks at desired intervals. Furthermore, it would be advantageous to be able to use the device to measure an object when marking is not required.

SUMMARY OF THE INVENTION

The present invention is directed to providing one or more of the advantages as set forth above.

According to the present invention this is accomplished by providing apparatus for marking preselected measurements on an object. The apparatus includes a device for receiving and storing data, a measurement device and a marking device. The measurement device measures preselected distance on the object and registers the measured distance with the stored data. The marking device marks the object when the preselected distance is registered. If desired, the device may be used solely as a measurement device when no marks are needed.

The foregoing and other advantages will become apparent from the following detailed description of the invention when considered in conjunction with the accompanying drawings. It is to be expressly understood, however, that the drawings are not intended as a definition of the invention but are for the purpose of illustration only.

DETAILED DESCRIPTION

Apparatus is provided for marking preselected measurements on an object. As an example, reference is made herein to applying such apparatus to marking such measurements on a piece of building material to be used in the assembling of a wall partition during the construction of a building. However, the apparatus has many and varied applications contemplated within the scope of this invention.

Figure 3:
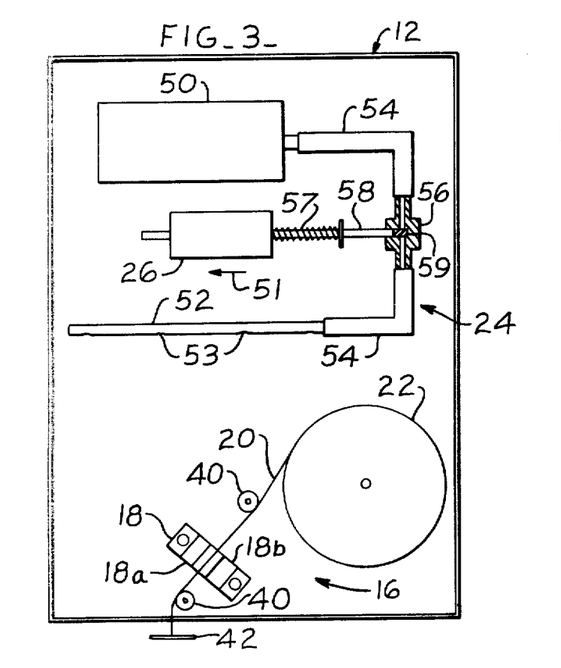
FIG. 3 is a plan view illustrating the back of the apparatus.
Figure 5:
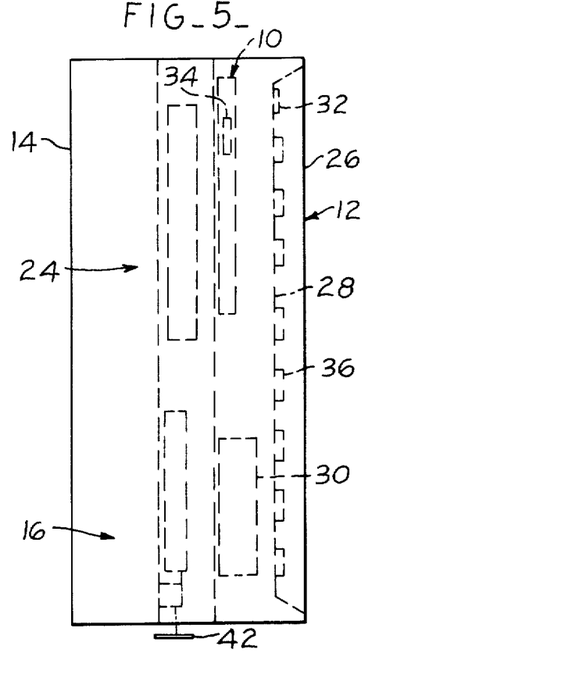
FIG. 5 is a side view illustrating the base which houses elements of the apparatus.

The apparatus, FIGS. 3 and 5, has a printed circuit 10 graphically represented; including means for receiving and storing data such as a commercially available one-chip microcomputer 34 factory programmed to customer specifications for receiving and storing measurement data. Preferably, the apparatus is offered in a practical form similar to a hand-held calculator having a keyboard 28 and, if desired, an LED display 32.

The data received and stored is data defining preselected distance measurement expressed in terms of feet, inches and fractions of an inch or their metric equivalents. The preselected distance includes a series of incremental distances which define the desired locations where the object is to be marked. The incremental distances may be equally spaced, unequally spaced or a combination of equally and unequally spaced incremental distances.

The means for receiving and storing data is attached to a base 12 including a guide 14 for guiding the base along the object in a substantially straight line. The base houses a self-contained power supply 30.

The apparatus also includes means 16 for measuring preselected distance on the object such as a movable measurement device having marks formed thereon at equally spaced, preselected intervals. The marks are counted as the measurement device moves relative to a sensor 18. The sensor is connected to circuit 10 to register the marks counted with the stored measurement data. As a result, the preselected distance is registered with the stored data.

The measurement device can be an extendable tape or wire 20 which can be retracted and stored by a resiliently mounted storing device such as a drum 22. Sensor 18 is provided to sense movement of the marks.

The apparatus further includes means 24 for marking the object in response to the preselected distance being registered. The means for marking is a device comprising energizing means such as a solenoid 26 which is connected to circuit 10 to be actuated for urging a marking medium into contact with the object.

The marking can be accomplished by a color-impregnated marking medium urged into direct contact with the object so as to deposit a residue on the object in response to such direct contact. The marking medium, such as an ink or dye, can be transferred to the object by being propelled under pressure onto the object. A more specific discussion follows.

Base

Base 12 shown in the Figures is provided in the form of a housing and is preferably formed of a high impact synthetic material such as a suitable plastic. However, a metallic material is probably a suitable alternative as are other materials.

Base 12 is formed in such a manner as to have a raised peripheral lip portion 26 around keyboard 28 for the purpose of recessing the keyboard for protection. Also, guide 14 is provided for guiding base 12 along the object in a substantially straight line. Guide 14 is formed as an extension of base 12.

All the elements of the marking apparatus are housed in or on the base including those elements already discussed and others to be discussed later.

Receiving and Storing Data

Circuit 10 provides for software to be stored in a commercially available one-chip microcomputer such as that presently manufactured and sold by TEXAS INSTRUMENTS under the name TMS 1000 or 1100. The TMS 1100 microcomputer designated 34, FIG. 11, has greater memory capability than the TMS 1000 and therefore is preferred. The software is stored by factory programming customized from instructions supplied by the customer. TEXAS INSTRUMENTS provides software classes and literature to potential new customers to aid in writing these instructions. The customizing initially costs several thousand dollars but when complete, the microcomputer can be purchased for only a few dollars each in production volume.

The TMS 1100 does the major portion of the work in the marking apparatus of this invention and is connected as shown in the drawing. It counts marks on tape 20 with the aid of an infra-red beam type sensor 18 such as that manufactured by TEXAS INSTRUMENTS and sold under the designation TIL-138 connected as shown in FIG. 11.

Figure 1:
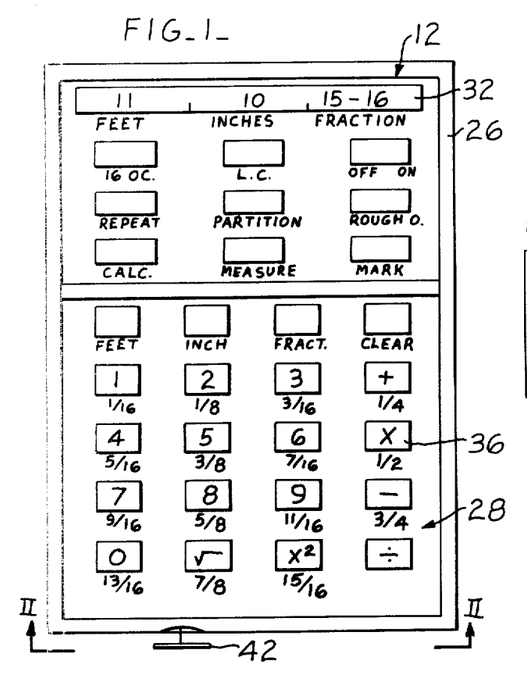
FIG. 1 is a plan view illustrating a keyboard configuration of the apparatus of this invention.
Figure 2:
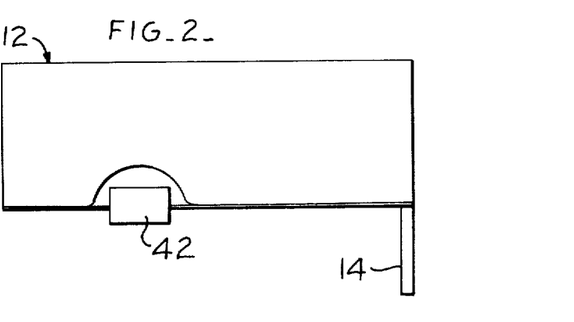
FIG. 2 is an end view of the apparatus.
Figure 10:
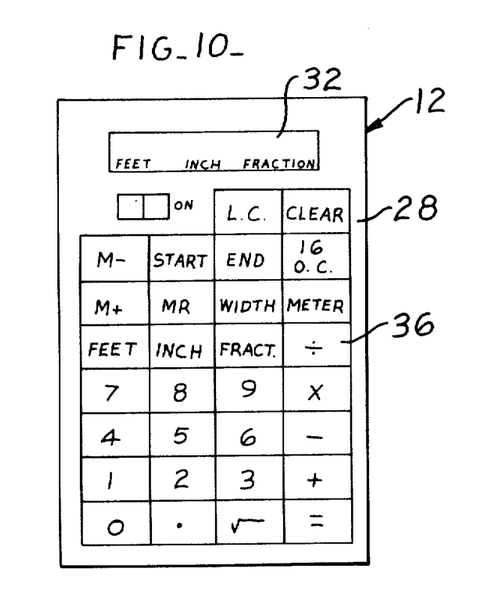
FIG. 10 is a view illustrating a preferred keyboard configuration.
Figure 11:
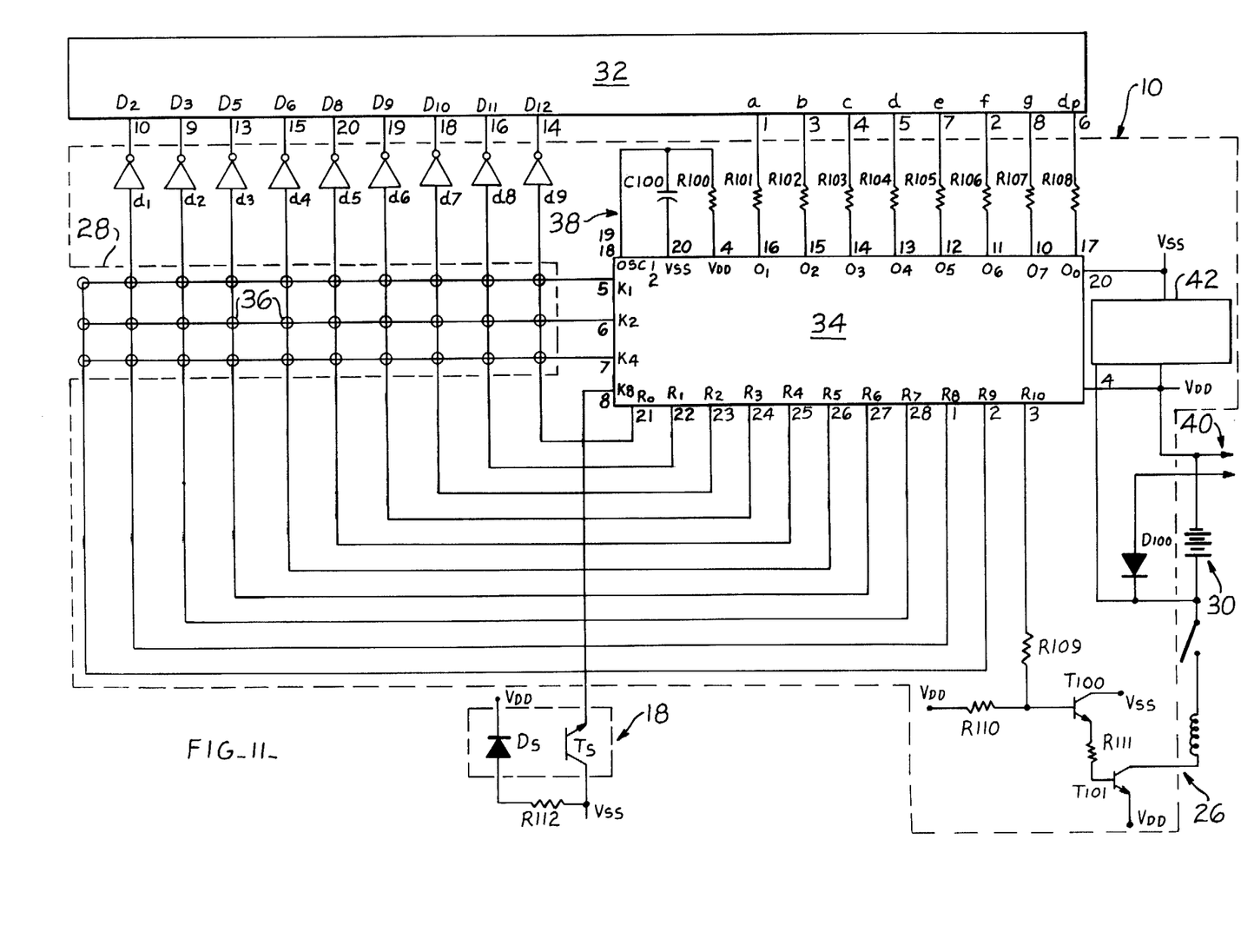
FIG. 11 is a view illustrating the wiring schematic for this invention.

Also, bi-metallic disc hand-held calculator type keyboard 28, such as that manufactured by TEXAS INSTRUMENTS and sold under the designation TI-KLIXON is connected as shown in FIG. 11. Keyboard 28 is capable of supporting thirty keys when wired as shown. The keys, designated 36 in the Figures, can be arranged in any desired pattern and each may be assigned any function within the capability of the TMS 1100. Such function assignments are indicated on the keyboard 28 as illustrated in FIGS. 1 and 10. Key assignments are accomplished during the customizing step during procurement of the TMS 1100 and is discussed later.

The calculator type LED display 32, such as that manufactured by TEXAS INSTRUMENTS and sold under the designation TIL-379-12, will suffice for purposes of this invention when connected as illustrated in the Figures. It should be noted, however, that while an LED display is probably desired, it is not necessary since the apparatus can successfully operate without the display. For example, it is noted that data, such as a phone number to be called, is fed into a telephone receiver without the need for a display or readout to confirm the correctness of the data.

An oscillator circuit 38 operates at 300 KHZ, which is quite satisfactory for this application. Power is supplied by power supply 30 including three size AA NICAD batteries which are rechargeable as indicated at 40. Charging power is provided by an AC transformer (not shown) similar to that used with well known calculators. A DC-DC converter 42 is used to provide the 15 volts required by microcomputer 34. Converter 42 is available from I.C. INC. and is designated DCO515D. Also supplied in the circuitry are an on-off switch 44 and a solenoid 26 such as that sold by ELECTRO-MECHANISMS and designated SP-50/3V.

The LED display 32, if used as is preferred, is wired as shown in FIG. 11. Pin numbers 10, 9, 13, 15, 20, 19, 18, 16, and 14 are the digit cathodes numbered D2, D3, D5, D6, D8, D9, D10, D11 and D12, respectively. The seven segment anodes a, b, c, d, e, f, g and decimal point (dp) are internally connected to pin numbers 1, 3, 4, 5, 7, 2, 8, and 6, respectively, as also shown. This connection provides for a physical space between the feet and inches and between the inches and fraction being displayed by leaving digits D4 and D7 unused.

Pin functions for the microcomputer 34 are also shown on FIG. 11. The O outputs $O_1$, $O_2$, $O_3$, $O_4$, $O_5$, $O_6$, $O_7$, $O_0$ (zero) are on pin numbers 16, 15, 14, 13, 12, 11, 10 and 17, respectively. The R outputs $R_0$, $R_1$, $R_2$, $R_3$, $R_4$, $R_5$, $R_6$, $R_7$, $R_8$, $R_9$, and $R_{10}$ are on pin numbers 21, 22, 23, 24, 25, 26, 27, 28, 1, 2 and 3, respectively. Pins 18 and 19 are the oscillator 1 and oscillator 2 pins which, in this instance, are connected together. Pin 20 is connected to $V_{SS}$ and Pin 4 is connected to $V_{DD}$. Pins 4 and 20 also connect to elements of the oscillator circuit.

$V_{SS}$ for the circuit is 15 volts and $V_{DD}$ is zero (0) volts. All resistances are expressed in ohms plus or minus ten percent, ¼ watt. All capacitors are plus or minus twenty percent. Each circled cross-point on keyboard 28 indicates a possible key position 36.

Figure 11A:
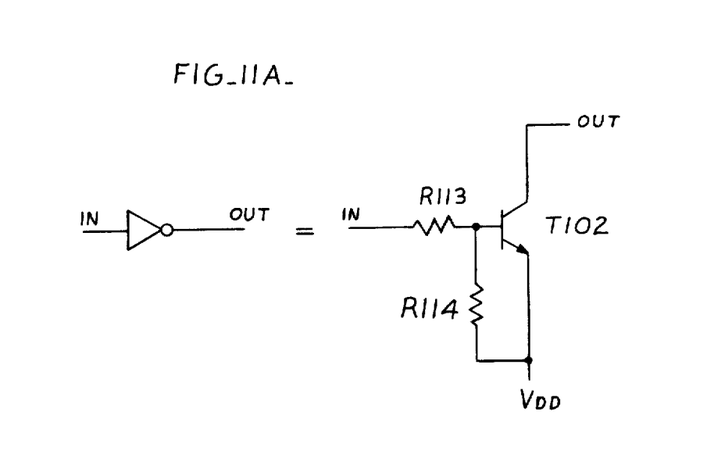
FIG. 11A is a partial schematic illustrating a driver circuit of this invention.
Figure 12:
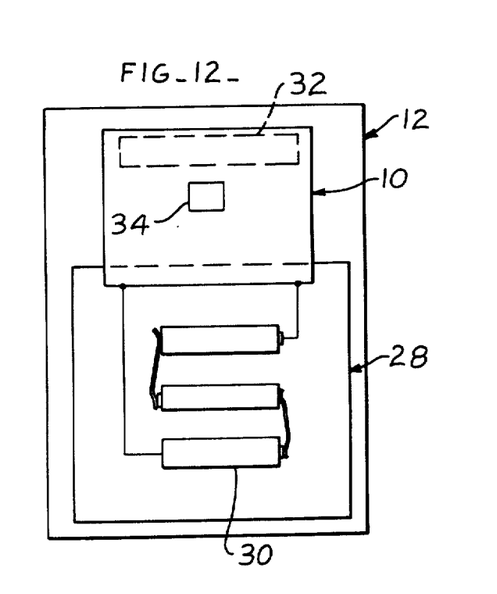
FIG. 12 is a plan view illustrating a graphic representation of the base and some elements of this invention housed in the base.

Drivers d1–d9 are used only if LED 32 is used. FIG. 11A illustrates the equivalent circuitry used in the drivers d1–d9.

Values for all resistors, capacitors, transistors and diodes in circuit 10, FIGS. 11 and 11A, are illustrated on the following table except for diode Ds and transistor Ts included in sensor 18 which is commercially available:

| Component | Value or Designation |
| --- | --- |
| C100 | 47 pf |
| D100 | IN914 |
| R100 | 47K |
| R101 | 1.5K, ¼W |
| R102 | 1.5K, ¼W |
| R103 | 1.5K, ¼W |
| R104 | 1.5K, ¼W |
| R105 | 1.5K, ¼W |
| R106 | 1.5K, ¼W |
| R107 | 1.5K, ¼W |
| R108 | 1.5K, ¼W |
| R109 | 4.7k |
| R110 | 22K |
| R111 | 4.7K |
| R112 | 1K, ¼W |
| R113 | 10k |
| R114 | 5K |

-continued

| Component | Value or Designation |
| --- | --- |
| T100 | 2N5449 |

Many possible combinations are available for the arrangement of keys 36 of keyboard 28 and the LED display 32. Two such combinations are shown in FIGS. 1 and 10.

In FIG. 1, for example, a key is designated (16 O.C.) for use when it is desired to strike a mark every sixteen inches on center. A key is designated (LC) for use when it is desired to center a value as a centerline mark to be struck. A key is designated (Repeat) for use when it is desired to enter a value as a measurement to be struck repeatedly at intervals. A key is designated (Partition) for use when it is desired to enter a certain value as a single measurement mark to be struck. A key is designated (Rough O) for use when it is desired to enter a value representing the width of an opening to be marked such as for a window or a door in a stud wall. Use of key (Rough O) would also be accompanied by use of key (LC). A key is designated (Calc.) for use when it is desired to operate the apparatus as a calculator. A key is designated (Measure) for use when it is desired to use the apparatus to operate as a measurement device only. Other keys represent numerical values or operations which are either self-explanatory or are common to calculator type keyboards.

Referring now to FIG. 10, a preferred keyboard 28 is illustrated and includes some similar keys 36 as described above. Other keys 36 include some standard calculator keys such as memory functions (M+); and (M−); and (MR); and other functions ($\sqrt{\phantom{x}}$); (+); (÷); and (=). In addition, a key 36 is designated (Start) to be used when it is desired to enter a value representing a measurement to be struck to mark the start of an opening. A key 36 is designated (End) to be used to enter a value representing a measurement to be struck to mark the end of the opening. A key 36 is designated (Meter) for use to enter metric values which are automatically converted to and displayed as feet, inches and fractions of an inch. A key 36 is designated (Width) for use when it is desired to enter a value representing measurements to be struck to mark the width of a desired opening. The key designated (Width) is used in combination with the key (LC) or (Start) or (End). The standard key designation (−) may also be used to indicate a mark is not to be struck inside an opening and the standard key (+) may also be used to indicate a mark is to be struck inside an opening.

It is evident from the foregoing that a keyboard arrangement can be varied. The desired keyboard arrangement and display will be custom tailored to match the desired commercially available factory programming applied to microcomputer 34.

Measuring and Sensing

Measuring is preferably accomplished by the use of a steel tape 20 including marking such as holes 44 formed therein. Tape 20 is preferably twenty feet in length. The holes are 0.025 inches in diameter and are provided at equally spaced intervals of 1/16 inches. Tape 20 is movably connected to base 12 by virtue of being wound on a storing means such as drum 22. Drum 22 is preferably resiliently mounted on base 12 in a manner so as to render tape 20 to be extendable and retractable. There are many well known ways to accomplish such resilient mounting. In addition, well known tensioning means such as wheels 40 are provided on base 12 to engage tape 20 and to limit undesired slack. Tape 20 includes a tab 42 which may be secured to a convenient place on the end of the object to be measured, such as is well known from the use of a common steel measuring tape.

Figure 4:
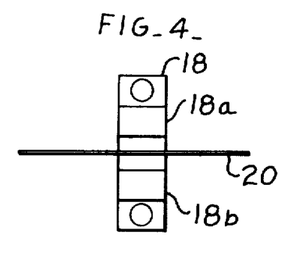
FIG. 4 is a view illustrating a sensor and measuring member.
Figure 4A:
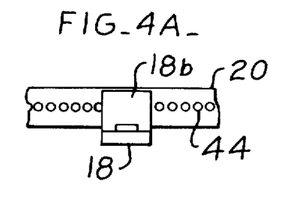
FIG. 4A is another view of the sensor and measuring member.

Tape 20 is provided to operate in combination with sensor 18 mounted on base 12 which, as previously described, is an infra-red type sensor. Thus an infra-red beam acting between portions 18$a,b$ of sensor 18 is interrupted as holes 44 of tape 20 are moved relative to the sensor between the portions 18$a,b$ as illustrated in FIGS. 3, 4 and 4A. Each interruption of the infra-red beam is registered with the stored data in microcomputer 34 by virtue of the circuitry discussed above. Sensor 18 cannot discriminate direction and thus tape 20 must be extended evenly and in one direction only.

There are possible alternatives to the preferred tape 20. A notched cable might be adaptable. As another possibility, a metal tape may be provided which reflects light or to periodically interrupt the flow of light from a source to a sensor. It is also contemplated that a wheel may be used to run across the surface of the object to be measured. Distance traveled could be determined from the revolutions of the wheel using the principle of an odometer. Also, the wheel could be marked or notched at intervals such as provided in tape 20 and used in combination with a sensor.

The apparatus contemplates use when measurement only is desired without marking and such measurement is to be read out on display 32.

Marking

Marking of the object to be measured is preferably accomplished by the marking device 24 illustrated in FIG. 3. Marking device 24 is attached to base 12 and is connected for actuating solenoid 26 as described above and shown in the circuitry of FIG. 11. Solenoid 26 acts as a means to urge a color impregnated marking medium such as ink or dye into contact with the object being measured. The ink or dye is stored under pressure in reservoir 50 and is ejected through nozzle 52 having ejection ports 53. A conduit 54 interconnects reservoir 50 and nozzle 52. A valve 56 is inserted in line with conduit 54 so as to interrupt flow of the ink or dye between reservoir 50 and nozzle 52. Arm 58 of solenoid 26 is connected to actuate plunger 59 in a manner permitting blockage of ink flow in valve 56 until solenoid 26 is actuated permitting movement of plunger 59 in the direction indicated by an arrow 51. Spring 57 aids in returning plunger 59 into the blockage position as shown.

Figure 6:
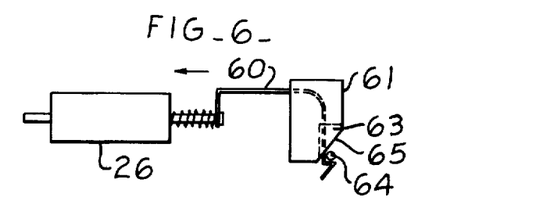
FIG. 6 is a view illustrating an alternative marking device of this invention.
Figure 7:
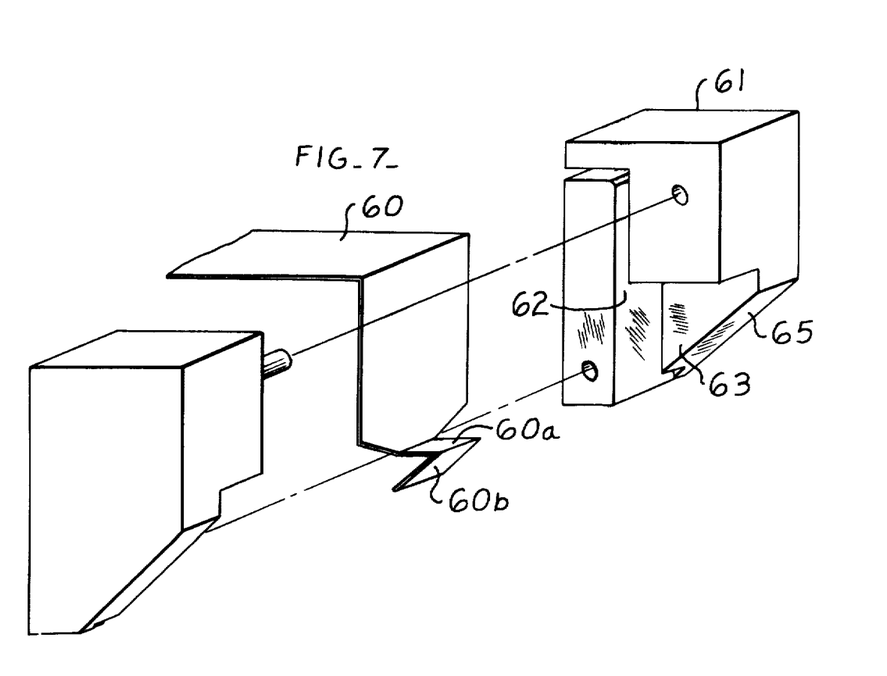
FIG. 7 is an exploded view further illustrating the marking device of FIG. 6.

Alternative marking devices are also contemplated in combination with solenoid 26. In FIGS. 6 and 7, for example, the solenoid can be used to move a flexible spring steel quill 60 relative to and guided by a quill guide 61. Quill 60 is routed through a passage 62 in guide 61. Quill 60 includes a ledge 60$a$ and a ramp 60$b$ which are moved within zone 63 of quill 61. A tensioned marking string 64 extends across ledge 60$a$ and when quill 60 is moved, due to actuation of solenoid 26, in the direction indicated by the arrow (FIG. 6), ledge 60$a$ is moved upwardly into zone 63. As a result, string 64 moves along incline 65 and is disengaged from ledge 60$a$. In this manner, string 64 is "plucked" and snaps into engagement with the object to be marked. When solenoid 26 is deactuated, quill 61 moves downwardly from zone 63 (FIG. 6) and ramp 60b guides string 64 back into position along ledge 60a.

Figure 9:
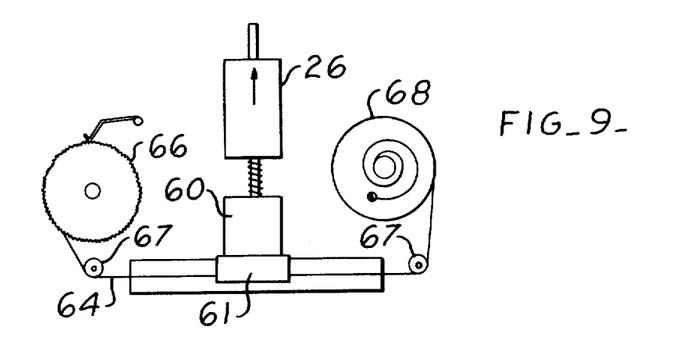
FIG. 9 is a view illustrating another marking device.

String 64 is a color-impregnated marking medium similar to a chalk line made of cotton and/or polyester. FIG. 9 illustrates that string 64 can be wound on a drum 68 at one end and connected to a ratchet type wheel 66 at the other end. Thus by use of ratchet wheel 66, line 64 which is tensioned by tension wheels 67 can be advanced to expose fresh or unused chalk for marking.

Figure 8:
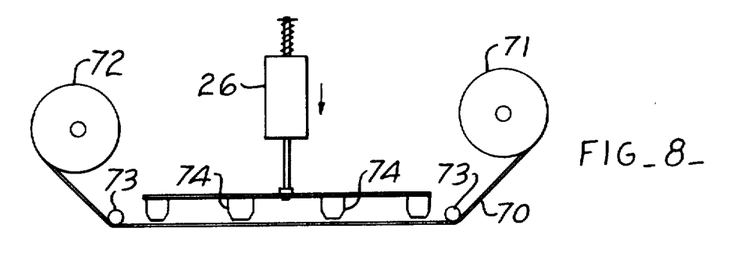
FIG. 8 is a view illustrating another marking device.

Another marking device is illustrated in FIG. 8. A color-impregnated marking medium such as a conventional typewriter ribbon 70 can be used and tensioned between reel 71 and take-up reel 72 by tensioners 73. Take-up reel 72 can be provided to be either manually or automatically advanced as desired. A plurality of hammers 74 are connected to be actuated by solenoid 26 so that actuation of solenoid 26 causes hammers 74 to urge marking medium 70 into contact with the object to be marked.

Other alternative marking devices include the possible use of electromagnetic and heat sensitive devices.

Operation

A few examples are offered to demonstrate the use of the apparatus with reference to the foregoing description. These examples are based on a use of the marking apparatus for marking an object such as a 2×4 board used as a base for a stud wall during the construction of a building. The wall usually includes 2×4 studs to be placed at intervals 16 inches apart on center (O.C.) and may include openings in the stud wall for windows and doorways.

Example A following contemplates use of a marking apparatus having the preferred keyboard and readout display such as that illustrated in FIG. 10 and the object of the example is to set up the marking apparatus to mark a board for studs every 16 inches. Also, mark a partition which is to be 5 feet, 4 and ¾ inches from the start.

|  | Display | | |
|---|---|---|---|
| Key In | Feet | Inches | Fraction |
| Clear |  |  | 0. |
| 16 |  |  | 16 |
| Inch | 01. | 04. | 00–16 |
| O.C. | C |  | 15 |
| + |  |  | 0. |
| 5 |  |  | 5 |
| Feet | 05. | 00. | 00–16 |
| 4 |  |  | 4 |
| Inches | 05. | 04. | 00–16 |
| 3 |  |  | 3 |
| Fract. |  |  | 3 |
| 4 |  |  | 4 |
| Fract. | 05. | 04. | 03–04 |
| End | C |  | 16 |

When the above is completed, secure tab 42 of tape 20 to the starting end of the board and extend tape 20 evenly along the board. The above-described apparatus will operate to strike marks on the board every 16 inches and to mark the board for the intersection of the partition of the above-described location. The "C 16" indicates that a total of 16 marks will be made in the twenty foot tape length. The total number of marks would be other than 16 if the tape used were other than twenty feet long. The displayed number is reduced each time the apparatus makes a mark.

Example B illustrates use of the apparatus for measuring only when no marking is to be done. For example, it is desired to measure the length of a board that will remain after 4 feet, 6 inches is cut off one end as follows:

|  | Display | | |
|---|---|---|---|
| Key In | Feet | Inches | Fraction |
| Clear |  |  | 0. |
| 4 |  |  | 4 |
| Feet | 04. | 00. | 00–16 |
| 6 |  |  | 6 |
| Inch | 04. | 06. | 00–16 |
| Start | C |  | 0 |

Secure tab 42 of tape 20 to one end of the board and evenly extend tape 20 along the board. The display will begin reading feet, inches and fractions after passing 4 feet, 6 inches from the end of the board to which tape 20 is secured.

Example C illustrates the use of the apparatus having the preferred keyboard and readout display such as that illustrated in FIG. 10 and the object of the example is to set up the marking apparatus to mark a board for studs at 16 inches on center with a 0.6 meter opening at 5 feet, four and 1/16 inch center. Also, do not mark 16 inch on center studs inside the opening.

|  | Display | | |
|---|---|---|---|
| Key In | Feet | Inches | Fraction |
| Clear |  |  | 0. |
| 16 |  |  | 16 |
| Inch | 01. | 04. | 00–16 |
| O.C. | C |  | 15 |
| — | C |  | 0 |
| .6 |  |  | 0.6 |
| Meter | 01. | 11. | 05–08 |
| Width | 01. | 11. | 05–08 |
| 5 |  |  | 5 |
| Feet | 05. | 00. | 00–16 |
| 4 |  |  | 4 |
| Inch | 05. | 04. | 00–16 |
| 1 |  |  | 1 |
| Fract. |  |  | 1 |
| 16 |  |  | 16 |
| Fract. | 05. | 04. | 01–16 |
| L.C. | C |  | 16 |

With the above completed, secure tab 42 of tape 20 to the starting end of the board and extend the tape evenly along the board. The apparatus will operate to strike marks on the board every 16 inches except within the 0.6 meter opening as set forth above.

The foregoing has described apparatus for marking preselected measurements on an object.

Other modifications and variations of the present invention are possible in light of the above teachings and it is contemplated that such will be apparent to one of ordinary skill in the art. It is therefore to be understood that within the scope of the appended claims the invention may be practiced otherwise than as specifically described.

What is claimed is:

1. Apparatus for marking preselected measurements on an object, comprising:
   a housing, said housing being of a construction sufficient for being hand-held;
   a source of electrical energy mounted in said housing;
   means for receiving and storing preselected data, said data means being a microcomputer mounted in said housing and connected to said source of electrical energy;

means for guiding said housing along said object in a substantially straight line, said means including a member extending from said housing for engagement with said object;

a storage member attached to said housing;

means for measuring preselected distance on said object, said measuring means connected for being extended from and retracted to said storage member, said measuring means being marked at equally spaced intervals;

means, connected to said energy source, for electrically sensing movement of said intervals when said measuring means is extended from said storage member, and for registering movement of said intervals with said preselected data; and means, connected to said enegy source, for marking said object in response to said registered movement of said intervals, said marking means being electrically energized for urging a color impregnated marking medium into repeated momentary contact with said object in a spaced marking pattern corresponding to said preselected stored data.

2. The apparatus of claim 1 further including a keyboard operably connected to said microcomputer.

3. The apparatus of claim 2, further including an LED display element operably connected to said microcomputer.

4. The apparatus of claim 3 wherein said means for marking includes:
a nozzle;
a reservoir;
dye stored in said reservoir under pressure;
means for conducting said dye from said reservoir to said nozzle:
a solenoid connected to said electrical energy source; and
means for interrupting said flow, said means being a valve operably connected to said solenoid.

5. The apparatus of claim 3 wherein said means for marking includes:
a guide;
a spring steel member engaged with said guide;
means connected to said electrical energy source for moving said spring steel member, said means being a solenoid; and
a marking element moved into engagement with said object in response to said spring steel member being moved by said solenoid.

6. The apparatus of claim 3 wherein said means for marking includes:
first and second reels;
a marking element extending between said reels;
a solenoid operably connected to said electrical energy source; and
means for urging said marking element into engagement with said object, said means being a plurality of hammers movable in response to operation of said solenoid.

7. Apparatus for marking preselected measurements on an object, comprising:
a housing;
a source of electrical energy mounted in said housing;
means for receiving and storing preselected data, said data means being a microcomputer mounted in said housing and connected to said source of electrical energy;
a storage member attached to said housing;
means for measuring preselected distance on said object, said measuring means connected for being extended from and retracted to said storage member, said measuring means being marked at equally spaced intervals;

means, connected to said energy source, for electrically sensing movement of said intervals when said measuring means is extended from said storage member, and for registering movement of said intervals with said preselected data; and means, connected to said energy source, for marking said object in response to said registered movement of said intervals, said marking means being electrically energized for urging a color impregnated marking medium into repeated momentary contact with said object in a spaced marking pattern corresponding to said preselected stored data.

8. Apparatus for marking preselected measurements on an object, comprising:
a housing;
a source of electrical energy mounted in said housing;
means for receiving and storing preselected data, said data means being a microcomputer mounted in said housing and connected to said source of electrical energy;
means for guiding said housing along said object in a substantially straight line, said means including a member extending from said housing for engagement with said object;
means for measuring preselected distance on said object, said measuring means connected for being extended from and retracted to said housing, said measuring means being marked at equally spaced intervals;
means, connected to said energy source, for electrically sensing movement of said intervals when said measuring means is extended from said storage member, and for registering movement of said intervals with said preselected data; and
means, connected to said energy source, for marking said object in response to said registered movement of said intervals, said marking means being electrically energized for urging a color impregnated marking medium into repeated momentary contact with said object in a spaced marking pattern corresponding to said preselected stored data.

9. Apparatus for marking preselected measurements on an object, comprising:
a housing;
a source of electrical energy mounted in said housing;
means for receiving and storing preselected data, said data means being a microcomputer mounted in said housing and connected to said source of electrical energy;
a keyboard operably connected to said microcomputer;
an LED display element operably connected to said microcomputer;
means for measuring preselected distance on said object, said measuring means movably mounted in said housing and marked at equally spaced intervals;
means, connected to said energy source, for electrically sensing movement of said intervals and for registering said movement with said preselected data; and
means, connected to said energy source, for marking said object in response to said registered movement of said intervals, said marking means being electrically energized for urging a color impregnated marking medium into repeated momentary contact with said object in a spaced marking pattern corresponding to said preselected stored data.

* * * * *